(12) United States Patent
Bernhard et al.

(10) Patent No.: US 9,172,522 B2
(45) Date of Patent: Oct. 27, 2015

(54) DATA TRANSMITTER AND DATA RECEIVER

(71) Applicant: Fraunhofer-Gesellschaft zur Foerderung der angewandten Forschung e.V., Munich (DE)

(72) Inventors: Josef Bernhard, Nabburg (DE); Gerd Kilian, Erlangen (DE); Andreas Tasch, Herzogenaurach (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 67 days.

(21) Appl. No.: 13/867,292

(22) Filed: Apr. 22, 2013

(65) Prior Publication Data

US 2013/0230060 A1    Sep. 5, 2013

Related U.S. Application Data

(63) Continuation of application No. PCT/EP2011/066779, filed on Sep. 27, 2011.

(30) Foreign Application Priority Data

Oct. 29, 2010 (DE) .......................... 10 2010 043 151

(51) Int. Cl.
- *H04L 7/00* (2006.01)
- *H04L 7/04* (2006.01)
- *H04L 27/00* (2006.01)

(52) U.S. Cl.
CPC .............. *H04L 7/00* (2013.01); *H04L 7/041* (2013.01); *H04L 27/0014* (2013.01); *H04L 2027/0067* (2013.01); *H04L 2027/0093* (2013.01)

(58) Field of Classification Search
None
See application file for complete search history.

(56) References Cited

U.S. PATENT DOCUMENTS

| 4,852,090 A | 7/1989 | Borth |
| 5,257,265 A | 10/1993 | Su et al. |

(Continued)

FOREIGN PATENT DOCUMENTS

| CN | 1200613 A | 12/1998 |
| CN | 101364964 A | 2/2009 |
| EP | 1 283 607 A1 | 2/2003 |
| JP | 2003-115783 A | 4/2003 |

OTHER PUBLICATIONS

Official Communication issued in International Patent Application No. PCT/EP2011/066779, mailed on Dec. 12, 2011.

(Continued)

*Primary Examiner* — Huy D Vu
*Assistant Examiner* — Hong Shao
(74) *Attorney, Agent, or Firm* — Keating & Bennett, LLP

(57) ABSTRACT

A data transmitter for transmitting a data packet to a data receiver via a communication channel includes a generator for generating the data packet and a transmitter for transmitting the data packet. The generator for generating the data packet is configured to generate a data packet having a first data block and a second data block and a predefined first reference sequence and second reference sequence for synchronizing the data receiver, wherein the first reference sequence is longer than the second reference sequence, and wherein in the data packet, the second data block is located between the first reference sequence and the second reference sequence, and the first reference sequence is located between the first data block and the second data block. The transmitter for transmitting the data packet is configured to transmit the data packet to the data receiver via the communication channel.

14 Claims, 9 Drawing Sheets

(56) References Cited

U.S. PATENT DOCUMENTS

| | | | |
|---|---|---|---|
| 5,400,362 A | | 3/1995 | Chennakeshu et al. |
| 6,275,552 B1* | | 8/2001 | Ando ............... 375/368 |
| 6,430,417 B1 | | 8/2002 | Raith et al. |
| 6,693,983 B1 | | 2/2004 | Moher et al. |
| 7,512,109 B2* | | 3/2009 | Trott et al. ............. 370/347 |
| 7,680,209 B2* | | 3/2010 | Touchais et al. ........ 375/296 |
| 2004/0218683 A1 | | 11/2004 | Batra et al. |
| 2007/0153930 A1* | | 7/2007 | Reid ............... 375/260 |
| 2009/0225741 A1* | | 9/2009 | Wang et al. ............ 370/345 |

OTHER PUBLICATIONS

Godtmann et al.; "A Concept for Data-Aided Carrier Frequency Estimation at Low Signal-to-Noise Ratios"; Proc. of IEEE International Conference on Communications; 2008; pp. 463-467.

Khayrallah et al.; "MAP Equalization for DQPSK in Multi-Pass Demodulation"; IEEE 52nd Vehicular Technology Conference; 2000; pp. 2249-2254.

Official Communication issued in corresponding Chinese Patent Application No. 2011800635057, mailed on Mar. 16, 2015.

\* cited by examiner

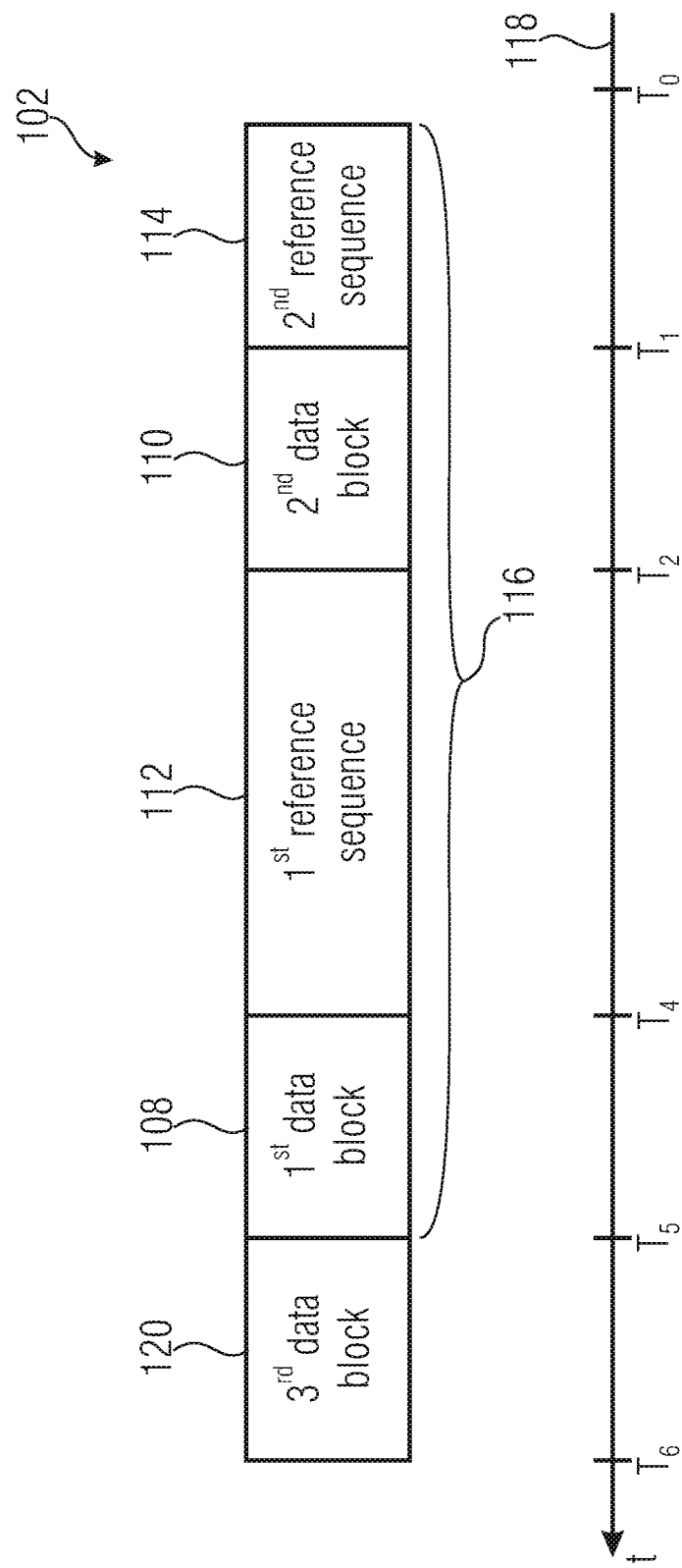

DATA TRANSMITTER AND DATA RECEIVER

CROSS-REFERENCE TO RELATED APPLICATIONS

This application is a continuation of copending International Application No. PCT/EP2011/066779, filed Sep. 27, 2011, which is incorporated herein by reference in its entirety, and additionally claims priority from German Application No. 102010043151.6, filed Oct. 29, 2010, which is also incorporated herein by reference in its entirety.

Embodiments of the present invention relate to a data transmitter for transmitting a data packet to a data receiver, in particular to a data transmitter which, for the purpose of synchronizing the data packet in the data receiver and of equalizing channel-encoded data packets, generates data packets having two reference sequences and transmits same to the data receiver via a communication channel.

BACKGROUND OF THE INVENTION

For transmitting small amounts of data, for example of data or payload data of a sensor, e.g. of a heating, electricity or water sensor, a radio transmission system may be employed. To this end, the sensor typically has a measuring means including a radio transmitter (data transmitter) attached to it which transmits the data to a data receiver by means of a burst-type data packet. In digital radio transmission systems, or radio communication systems, training sequences, or pilots, are typically used for synchronizing the data packet in the data receiver. Training sequences are deterministic or pseudorandom binary data sequences, e.g. PRBS (pseudorandom bit stream) sequences transmitted to the data receiver by the data transmitter along with the actual payload data within the data packet. The training sequences are known to the data receiver. By correlating a receive data stream with the known training sequences, the data receiver may determine the temporal position of the known training sequences in the receive data stream. In this context, the correlation function comprises, at the location of the training sequence in the receive data stream, a correlation peak which is the higher, or the larger, the better the receive data stream matches the known training sequences. The more the receive data stream, or a transmission signal, is superimposed by noise, however, the lower or smaller the correlation peak of the correlation function will be.

In the publication "A Concept for Data-Aided Carrier Frequency Estimation at Low Signal-to-Noise Ratios" by Susanne Godtmann, Niels Hadaschik, Wolfgang Steinert and Gerd Ascheid, the training sequence is subdivided into two parts spaced apart from each other, which enables performing improved frequency estimation.

In a radio transmission system wherein a code gain or coding gain is accomplished by means of code combining, i.e., by combining two or more data packets, by transmitting redundant information in several different data packets at different times, it is useful to detect the individual data packets even when the signal-to-noise ratio (SNR) is very low and is not sufficient for (fully) decoding an individual data packet. Depending on the code gain by means of said combination of several data packets, the signal-to-noise ratio that may be used for decoding and at which the data can still be detected decreases at the data receiver. However, for realizing the code gain it is useful that the individual data packets can be found or determined or partly be decoded, even incorrectly, even in the case of a low signal-to-noise ratio, in the receive data stream.

SUMMARY

According to an embodiment, a data transmitter for transmitting a data packet to a data receiver via a communication channel may have: a generator for generating the data packet having a first data block and a second data block and a predefined first reference sequence and second reference sequence for synchronizing the data packet in the data receiver, wherein the first reference sequence is longer than the second reference sequence, and wherein in the data packet, the second data block is located between the first reference sequence and the second reference sequence, and the first reference sequence is located between the first data block and the second data block; and a transmitter for transmitting the data packet to the data receiver via the communication channel; wherein the generator for generating the data packet is configured to provide, in the data packet, the first reference sequence to be double the length of the second reference sequence; and wherein the generator for generating the data packet is configured to subdivide, in the data packet, the first reference sequence into a first reference subsequence and a second reference subsequence, the first reference subsequence and the second reference subsequence each having the length of the second reference sequence.

According to another embodiment, a data receiver for receiving a data packet from a data transmitter via a communication channel, the data packet having a first data block and a second data block and a predefined first reference sequence and second reference sequence for synchronizing the data receiver, wherein, in the data packet, the first data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each having the length of the second reference sequence, may have: a receiver for receiving the data packet, said receiver being configured to localize the first reference sequence and the second reference sequence of the data packet in the receive data stream and to determine the data packet on the basis of a determinable transmission parameter which may be derived from the first reference sequence and from the second reference sequence.

According to another embodiment, a method of transmitting a data packet to a data receiver via a communication channel may have the steps of: generating the data packet having a first data block and a second data block and a predefined first reference sequence and second reference sequence for synchronizing the data receiver, wherein the first reference sequence is longer than the second reference sequence, and wherein in the data packet, the first data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each having the length of the second reference sequence; and transmitting the data packet to the data receiver via the communication channel.

According to another embodiment, a method of receiving a data packet from a data transmitter via a communication channel, the data packet having a first data block and a second data block and a predefined first reference sequence and second reference sequence for synchronizing the data receiver, wherein, in the data packet, the first data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each having the length of the second reference sequence may have the steps of: localizing the first reference sequence and the second reference sequence in the receive data stream; and determining the data packet in the receive data stream on the basis of a determinable transmission parameter which may be derived from the first reference sequence and from the second reference sequence.

Another embodiment may have a computer program for performing, when the computer program runs on a computer or microprocessor, the method of transmitting a data packet to a data receiver via a communication channel, which method may have the steps of: generating the data packet having a first data block and a second data block and a predefined first reference sequence and second reference sequence for synchronizing the data receiver, wherein the first reference sequence is longer than the second reference sequence, and wherein in the data packet, the first data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each having the length of the second reference sequence; and transmitting the data packet to the data receiver via the communication channel.

Another embodiment may have a computer program for performing, when the computer program runs on a computer or microprocessor, the method of receiving a data packet from a data transmitter via a communication channel, the data packet having a first data block and a second data block and a predefined first reference sequence and second reference sequence for synchronizing the data receiver, wherein, in the data packet, the first data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each having the length of the second reference sequence, which method may have the steps of: localizing the first reference sequence and the second reference sequence in the receive data stream; and determining the data packet in the receive data stream on the basis of a determinable transmission parameter which may be derived from the first reference sequence and from the second reference sequence.

The invention provides a data transmitter for transmitting a data packet to a data receiver via a communication channel, comprising a means for generating the data packet and a means for transmitting the data packet. The means for generating the data packet is configured to generate a data packet having a first data block and a second data block and a predefined first reference sequence and second reference sequence for synchronizing the data packet in the data receiver, wherein the first reference sequence is longer than the second reference sequence, and wherein in the data packet, the second data block is located between the first reference sequence and the second reference sequence, and the first reference sequence is located between the first data block and the second data block. The means for transmitting the data packet is configured to transmit the data packet to the data receiver via the communication channel.

The invention further provides a data receiver for receiving a data packet from a data transmitter via a communication channel, the data packet comprising a first data block and a second data block and a predefined first reference sequence and second reference sequence for synchronizing the data packet in the data receiver, wherein, in the data packet, the second data block is located between the first reference sequence and the second reference sequence, and the first reference sequence is located between the first data block and the second data block. The data receiver comprises a means for receiving the data packet which is configured to localize the first reference sequence and the second reference sequence of the data packet in the receive data stream and to determine, or detect (e.g. equalize), the data packet on the basis of a determinable transmission parameter which may be derived from the first reference sequence and from the second reference sequence.

In embodiments, the data transmitter generates a data packet having a first reference sequence and a second reference sequence. The first and second reference sequences are known to the data receiver, which enables the data receiver to localize the first reference sequence and the second reference sequence and, thus, the data packet in a receive data stream. Because of the configuration of the inventive data packet, which has a first long reference sequence located, in the data packet, between the first data block and the second data block, and which has a second reference sequence which is shorter than the first reference sequence and is located in the data packet such that it is spaced apart, by means of the second data block, from the first reference sequence, it is possible to localize, or detect, the first reference sequence and the second reference sequence in the receive data stream even in the case of a low signal-to-noise ratio.

Moreover, the means for generating the data packet of the data transmitter may be configured to subdivide, in the data packet, the first reference sequence into a first reference subsequence and a second reference subsequence, the first reference subsequence and the second reference subsequence each having the length of the second reference sequence.

In an advantageous embodiment, the means for generating the data packet of the data transmitter is configured to provide, in the data packet, the first reference subsequence, the second reference subsequence, and the second reference sequence as ML sequences (MLS=maximum length sequences), respectively, each having an additional binary element.

The means for generating the data packet of the data transmitter may further be configured to derive the first data block and the second data block of the data packet from a first base data block.

In addition, the means for generating a data packet of the data transmitter may be configured to derive a third data block and a fourth data block from a second base data block and to provide the third data block and the fourth data block in the data packet, the third data block in the data packet being located at a data packet end, and the fourth data block in the data packet being located at a data packet start.

In an advantageous embodiment, the means for receiving the data packet of the data receiver may further be configured to correlate the receive data stream with the first reference sequence and with the second reference sequence, which are known to the data receiver, so as to localize the first reference sequence and the second reference sequence of the data packet in the receive data stream.

In addition, the data receiver may comprise a means for equalizing the data blocks of the data packet, said means being configured to perform equalization for the first data block on the basis of the first reference sequence so as to obtain an equalized first data block, and to perform equalization for the second data block on the basis of the first reference sequence or of a reference subsequence adjacent to the second data block and of the second reference sequence so as to obtain an equalized second data block.

The means for equalizing the data blocks of the data receiver may be configured to decode the equalized first data block and second data block so as to obtain a decoded first data block and second data block. Moreover, the means for equalizing the data blocks of the data receiver may be configured to encode the decoded first data block or second data block so as to obtain an encoded first data block or second block. Equalization for a third data block may be performed on the basis of the encoded first data block if the first data block in the data packet has a smaller temporal distance from the third data block than does the second data block. Alternatively, equalization for the third data block may be performed on the basis of the encoded second data block if the second data block in the data packet has a smaller temporal distance from the third data block than does the first data block. Moreover, equalization for a fourth data block may be performed on the basis of the encoded first data block if the first data block in the data packet has a smaller temporal distance from the fourth data block than does the second data block. Alternatively, equalization for the fourth data block may be performed on the basis of the encoded second data block if the second data block in the data packet has a smaller temporal distance from the fourth data block than does the first data block. Furthermore, the third data block and the fourth data block may be derived from a second base data block, the third data block in the data packet being located at a data packet end, and the fourth data block in the data packet being located at a data packet start.

Additionally, the means for equalizing the data blocks of the data receiver may be configured to perform equalization for the first data block, the second data block, the third data block, and the fourth data block while using a frequency estimation, phase estimation or channel estimation.

Further embodiments of the invention additionally relate to methods of transmitting a data packet and of receiving a data packet as well as to computer programs for performing the inventive methods.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
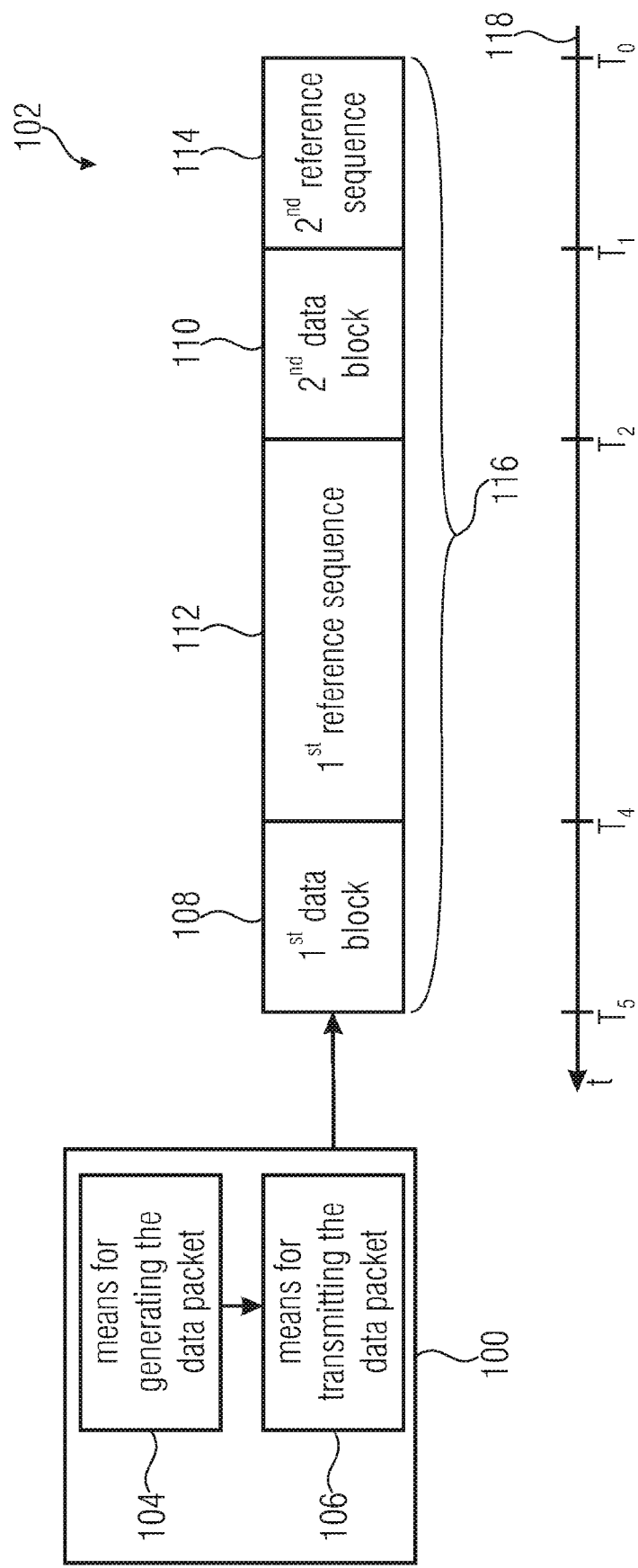
FIG. 1 shows a schematic view of an embodiment of a data transmitter as well as an embodiment of a data packet transmitted by the data transmitter.

In the following description of the embodiments of the invention, elements that are equal or equal in function are provided with the same reference numerals in the figures, so that their descriptions in the different embodiments are interchangeable.

FIG. 1 shows a schematic view of an embodiment of a data transmitter 100 and an embodiment of a data packet 102 transmitted by the data transmitter 100. The data transmitter 100 is configured to transmit a data packet 102 to a data receiver via a communication channel. To this end, the data transmitter 100 comprises a means 104 for generating the data packet 102 and a means 106 for transmitting the data packet 102.

The means 104 for generating the data packet 102 is configured to generate a data packet 102 having a first data block 108, a second data block 110, a predefined first reference sequence 112 and a predefined second reference sequence 114 for synchronizing the data packet in the data receiver, wherein the first reference sequence 112 is longer than the second reference sequence 114, and wherein in the data packet 102, the second data block 110 is located between the first reference sequence 112 and the second reference sequence 114, and the first reference sequence 112 is located between the first data block 108 and the second data block 110. According to the invention, thus, what is generated is not a data packet having only one training sequence or reference sequence but a data packet 102 wherein the reference sequence is subdivided into a first reference sequence 112 and a second reference sequence 114, the first reference sequence 112 and the second reference sequence 114 having different lengths and being spaced apart from each other in the data packet 102 by means of a data block, e.g., by means of the second data block 110. In a hardware implementation, the means 104 for generating the data packet 102 may be a microprocessor or microcontroller, whereas the means 106 for transmitting the data packet 102 may be a transmission unit.

What follows is a description, by means of a time axis 118, of a temporal occurrence of a data block and/or a reference sequence in the data packet 102. The times T0 to TN of the time axis 118 may characterize a time sequence of transmitting the data blocks and/or reference sequences.

The first data block 108, the first reference sequence 112 and the second data block 110 form a data packet core area 116, the second reference sequence 114 being adjacent, in the data packet 102, to the data packet core area 116. In this context, the second reference sequence 114 may be located, in the data packet, at a data packet start between times $T_0$ and $T_1$, i.e., temporally before the data packet core area 116 extending from time $T_1$ to $T_5$. Alternatively, the second reference sequence 114 may be located, in the data packet 102, at a data packet end, i.e., temporally after the data packet core area 116. Optionally, further n data blocks (n can be an element of natural numbers) may be provided, in the data packet 102, temporally before and/or after the core area 116.

The means 104 for generating the data packet 102 may further be configured to provide, in the data packet 102, the first reference sequence 112 and the second reference sequence 114 as pseudorandom binary sequence in each case, e.g., as a PRBS sequence or as an ML sequence. ML sequences are pseudorandom binary sequences of the length ($2^m-1$), the number of binary ones of the ML sequence being higher by one, by definition, than the number of binary zeros. In the frequency range, the representation of an ML sequence is similar to white noise. In embodiments, the first reference sequence 112 and the second reference sequence 114 may be derived from a long pseudorandom sequence, e.g., from an ML sequence, it being possible for the first reference sequence to correspond to a first part, and for the second reference sequence 114 to correspond to a second part, of the long pseudorandom sequence.

For obtaining the payload data, the means 104 for generating the data packet 102 may comprise an interface configured to obtain, e.g., payload data from a sensor. The sensor may be a heating, electricity or water meter, for example. However, it shall be noted that the inventive approach is applicable to any radio transmission systems for transmitting (e.g., channel-coded) data packets. A data block, e.g., the first data block 108 or the second data block 110, may be derived from the payload data. In addition, a data block may be provided with redundancy, e.g., with CRC (cyclic redundancy check) bits, for a redundancy check. In addition, a data block may comprise the payload data in an encoded form; in one embodiment, the payload data in the data block are encoded such that the encoded payload data have redundant components.

Moreover, the first data block 108 and the second data block 110 may have different lengths, it being possible for the first data block 108 to be longer than the second data block (or vice versa). In embodiments, a data block may thus comprise a limited number of bits which is predefined in each case. Alternatively, the first data block 108 and the second data block 110 may be equal in length, it being possible for the length of the first data block 108 and of the second data block 110 to be specified and/or predefined in advance, e.g., during evaluation and processing of the payload data. In addition, the lengths of the respective data blocks may be dynamically adapted, e.g., in dependence of a payload data density or amount of payload data, to the payload data and/or information, as a result of which, e.g., a data packet 102 having data blocks of different lengths may arise. Furthermore, the redundancy of the respective data blocks may be adapted to a priority and/or relevance of the payload data or information; thus, e.g., information of higher relevance may be provided with more redundancy than information of lower relevance.

The means 106 for transmitting the data packet 102 is configured to transmit the data packet 102 to the data receiver via the communication channel, e.g., in the form of a radio transmission path. In embodiments, the means 106 for transmitting the data packet 102 may transmit the data packet 102 to the data receiver via the communication channel e.g. by means of MSK modulation (MSK=minimum shift keying), PSK modulation (PSK=phase shift keying, digital phase modulation), QAM modulation (QAM=quadrature amplitude modulation), FSK modulation (FSK=frequency shift keying, digital frequency modulation) or by means of a different analog or digital modulation at a corresponding carrier frequency.

Figure 2A:
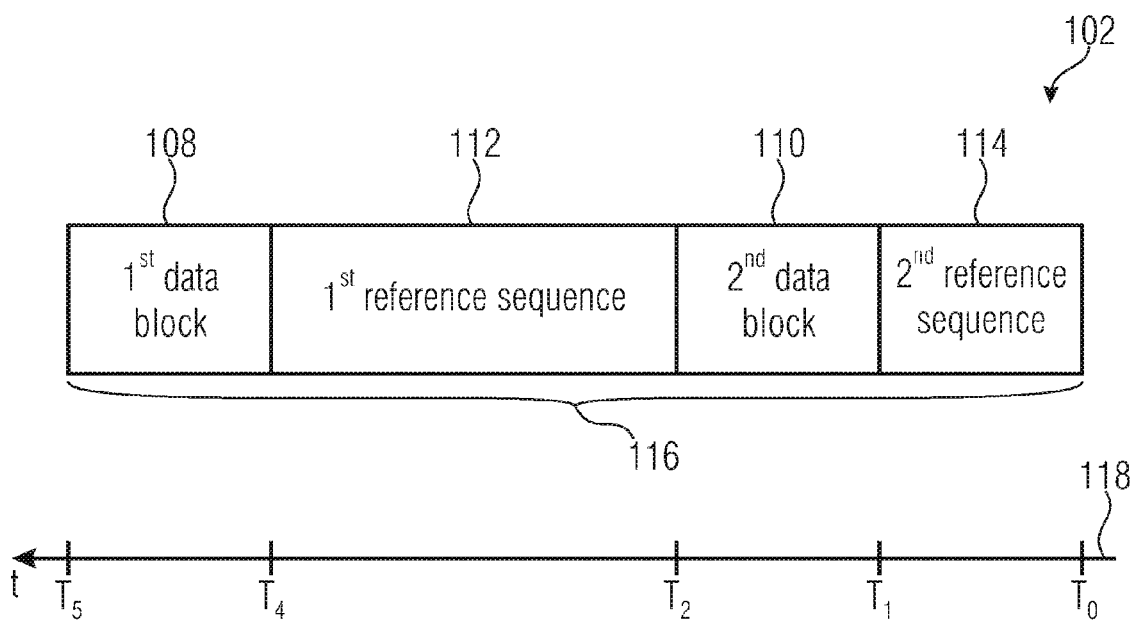
FIGS. 2a, b, c show three embodiments of the data packets transmitted by the data transmitter, in schematic views in each case.
Figure 2B:
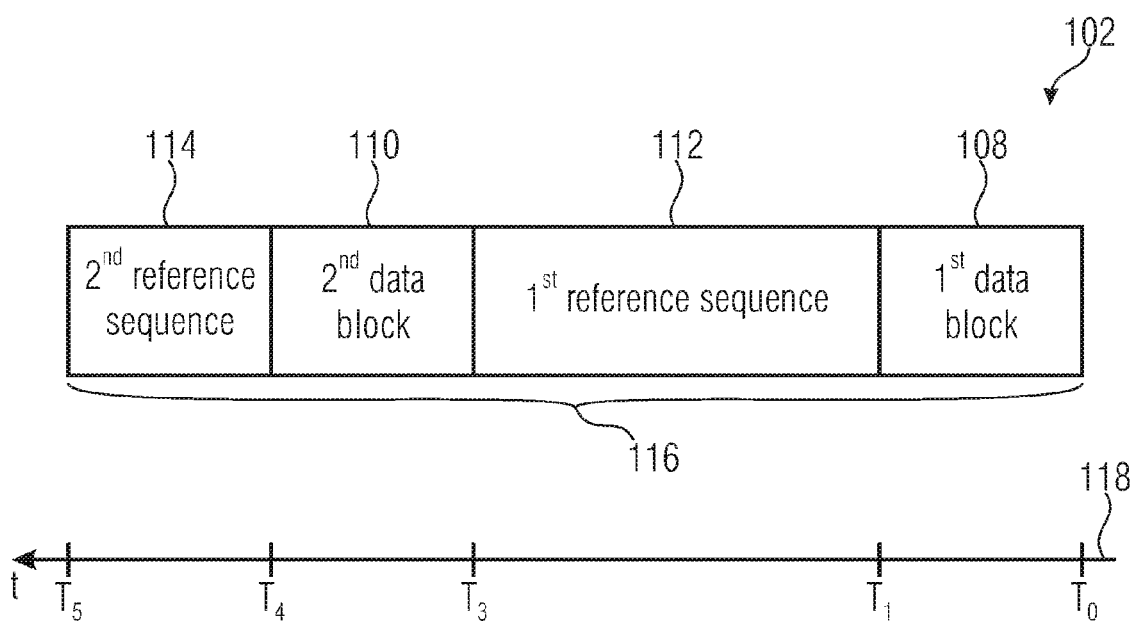
Figure 2C:
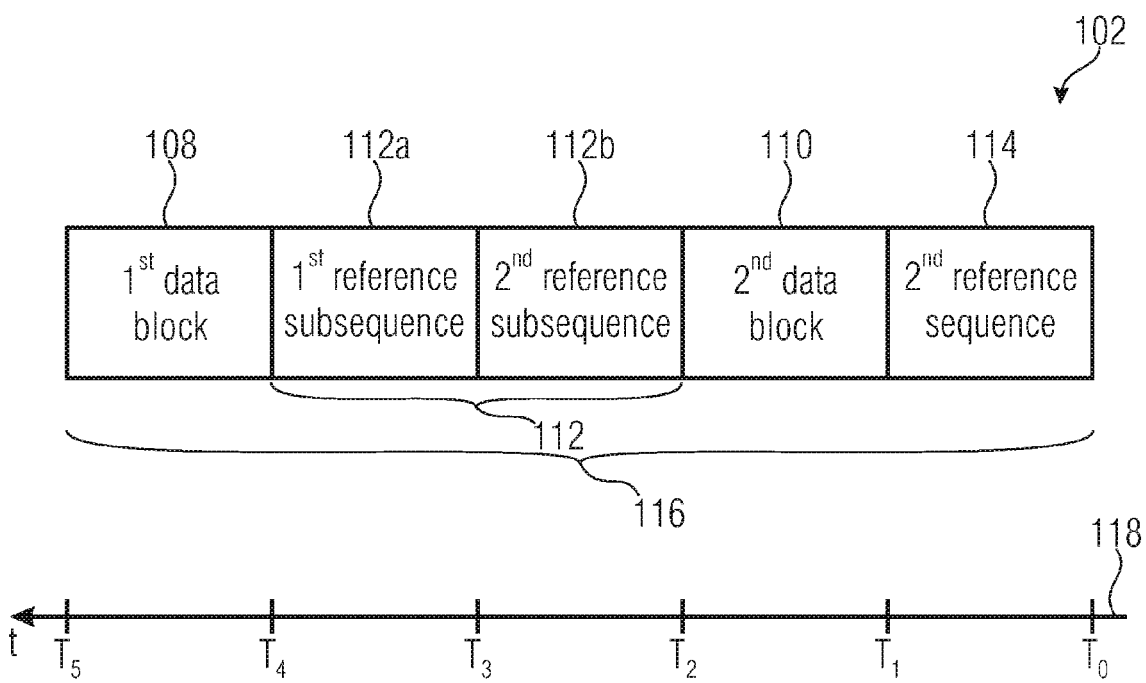

FIGS. 2a to 2c show three embodiments of the data packets 102 transmitted by the data transmitter 100, in schematic views in each case. In the embodiment shown in FIG. 2a, the first data block 108 is temporally located at the data packet end between the times $T_4$ and $T_5$. The first reference sequence 112 is located, in the data packet 102, between the first data block 108 and the second data block 110 and extends from time $T_2$ to $T_4$, the first reference sequence 112, the first data block 108 and the second data block 110 forming a data packet core area 116 extending from time $T_1$ to $T_5$. The second reference sequence 114, which is shorter than the first reference sequence 112, is located, in the date packet 102, temporally before the second data block 110 between times $T_0$ and $T_1$ and, thus, at the data packet start.

In the embodiment shown in FIG. 2b, the first reference sequence 112 is also located between the second data block 110 and the first data block 108. However, the second reference sequence 114 is located at the data packet end between times $T_4$ and $T_5$, so that the data packet core area 116 extends from time $T_0$ to $T_4$. In the data packet 102 shown in FIG. 2b, the first data block 108, the first reference sequence 112, the second data block 110 and the second reference sequence 114 thus are located, with respect to the data packet shown in FIG. 2a, in a temporally reversed sequence in the data packet 102.

The means 104 for generating the data packet 102 may further be configured to implement, in the data packet 102, the first reference sequence 112 to have (precisely) double the length of the second reference sequence 114. In addition, the means 104 for generating the data packet may be configured to subdivide, in the data packet 102, the first reference sequence 112 into a first reference subsequence 112a and a second reference subsequence 112b, the first reference subsequence 112a and the second reference subsequence 112b each having the length of the second reference sequence 114.

In the embodiment shown in FIG. 2c, the first reference subsequence 112a, the second reference subsequence 112b, and the second reference sequence 114 are equal in length, or equal in size. In addition, in the embodiment shown in FIG. 2c, the first data block 108 forms the first reference subsequence 112a, the second reference subsequence 112b, and the second data block 110 forms a data packet core area 116, the second reference sequence 114 being located, in the data packet 102, temporally before the data packet core area 116. Alternatively, the second reference sequence 114 may be located, e.g., temporally after the data packet core area 116 and, thus, at the data packet end. Moreover, the first reference subsequence 112a, the second reference subsequence 112b, and the second reference sequence 114 may be random or pseudorandom binary sequences.

In embodiments, the means 104 for generating the data packet 102 may be configured to generate a data packet 102 in that the first reference subsequence 112a, the second reference subsequence 112b, and the second reference sequence 114 are identical, i.e., the first reference subsequence 112a is identical with the second reference subsequence 112b and is identical with the second reference sequence 114.

In addition, the first reference subsequence 112a, the second reference subsequence 112b, and the second reference sequence 114 may each be configured as an ML sequence having an additional binary element, so that the data packet 102 comprises three ML sequences of the length ($2^m-1$), each of which has been extended by one binary element. The binary element may be, e.g., a binary "one" or a binary "zero", it being possible for the binary element to be located, within the reference sequence and/or reference subsequence, temporally before or after the ML sequence. The ML sequence may thus be extended by one bit by means of the binary element, e.g., with a zero bit. Moreover, the first reference subsequence 112a, the second reference subsequence 112b, and the second reference sequence 114 are not transmitted successively, but in two parts, as the first reference sequence 112 and the second reference sequence 114, which are spaced apart from each other in the data packet by means of a data block. To this end, two ML sequences of identical length are combined and are separated, as the first reference sequence 112, from the third ML sequence and/or the second reference sequence 114 by means of a data block.

The first data block 108 and the second data block 110 may be derived from a base data block, as will be described in more detail below with reference to the description of the embodiment shown in FIG. 5. A first part of the base data block, e.g., the first data block 108, may be temporally located on a first side of the first reference sequence 112. A second part of the base data block, e.g., the second data block 110, is arranged, in the data packet, to be temporally located on the other, or second, side of the first reference sequence 112 and/or of the pair of ML sequences, so that the base data block is temporally located before (on the left on the time axis 118) and temporally after (on the right on the time axis 118) the ML sequence tuple. Preferably, the base data block is subdivided into two parts and/or data blocks identical in size. However, equivalent subdivision is not mandatory.

Extension of the ML sequences by one bit may be effected since the bits are modulated with a $(2^n)$-stage modulation, for example with a (non-differential) MSK modulation. If a sequence or reference sequence or reference subsequence consists of an even number of bits, that bit which follows said reference sequence or reference subsequence will be mapped, in the MSK modulation, to the same axis of a constellation diagram as the first bit of the first reference sequence or reference subsequence. By means of the even number of bits of the first reference subsequence 112a, of the second reference subsequence 112b and of the second reference sequence 114 as well as of the data block between the first reference sequence 112 and the second reference sequence 114, i.e., of the second data block 110, one achieves that all of the reference sequences, that is the first reference subsequence 112a, the second reference subsequence 112b, and the second reference sequence 114, have the same constellation points following modulation. The complex baseband representation therefore contains three identical reference sequence portions and/or training sequence portions.

For simple implementation into, e.g., a microcontroller, the length of the data blocks which belong together may be selected to be an integer multiple of 8 bits. The extension of the ML sequences by one bit correspondingly results in that in one embodiment, a training sequence, e.g., the first reference subsequence 112a, the second reference subsequence 112b, and the second reference sequence 114, each are exactly four bytes in length.

For localizing the first and second reference sequences 112 and 114 in a data stream, or receive data stream, the receive data stream may be correlated with the known first and second reference sequences 112 and 114. The amount of the correlation function comprises, at the location or temporal position, a correlation peak which is the higher, or the larger, the better the receive data stream matches the known first and second reference sequences 112 and 114. The more the signal is superimposed by noise, the smaller the amount of the correlation peak will be. In the correlation, antipodal ML sequences may be used which have the property that the result of the correlation function approaches a delta function (correlation peak) when an ML sequence is correlated with a periodically continued version of the same ML sequence, i.e., when there is a so-called periodic autocorrelation function. Antipodal sequences s may be generated from binary sequences x by the following mapping:

x_k=0 becomes s_k=−1 and
x_k=1 becomes s_k=+1.

In embodiments it is thus possible to detect the data packet 102 by means of the first and second reference sequences 112 and 114 "in noise", i.e., at a low signal-to-noise ratio.

Figure 3A:
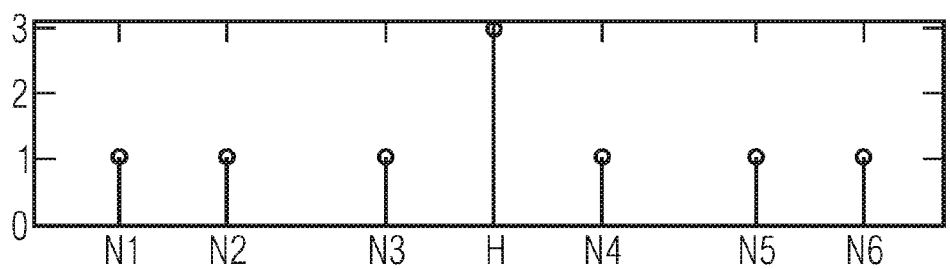
FIGS. 3a, b show embodiments of the correlation function for three successive ML sequences and for a separate third ML sequence, in schematic views in each case.
Figure 3B:
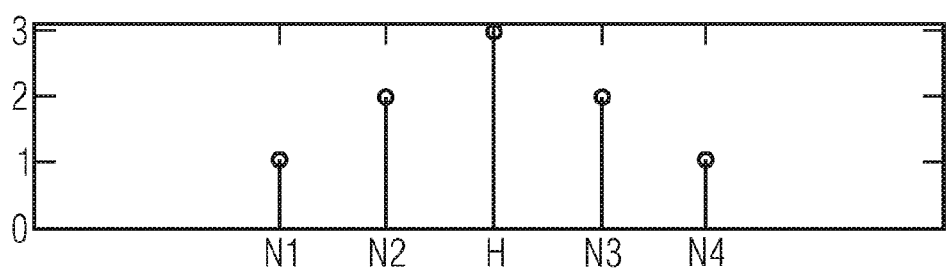

FIG. 3 shows a schematic view of a distribution of correlation peaks of a correlation of three ML sequences with the receive data stream, the third of the three ML sequences being separated, whereas FIG. 3b shows a schematic view of a distribution of correlation peaks of a correlation of three successive ML sequences with the receive data stream, the time being plotted on the abscissa, and the normalized amount of the correlation function being plotted on the ordinate.

Due to the subdivision of the reference sequence into a first reference sequence 112 and a second reference sequence 114, which are separated from each other by means of a data block, secondary peaks N1 to N6, which are smaller in terms of amount, are yielded in the synchronization in the data receiver for the correlation function as compared to only one reference sequence. In addition, the secondary peaks N1 to N6 have the same (e.g., normalized) amount and/or the same amplitude. In the distribution of correlation peaks, which is shown in FIG. 3a, all of the secondary peaks N1 to N6 have an amount of "1", whereas the main peak H has an amount of "3". Without the separation of the second reference sequence 114, the secondary peaks N1 to N6 would have an amount increasing toward the main peak H, as is depicted in FIG. 3b. Starting from the secondary peaks N1 and N4 with the amount of "1", the amount increases to an amount of "2" for the secondary peaks N2 and N3, whereas the main peak H also comprises an amount of "3". This may complicate identification of the main peak H in particular in the event of noise, i.e., in the event of a poor signal-to-noise ratio.

In addition, in the distribution of correlation peaks which is shown in FIG. 3a, the main peak H has three times the height of the secondary peaks N1 to N6. Due to the inventive arrangement of the first and second reference sequences 112 and 114, the main peak H may thus be more easily distinguished and/or separated from the secondary peaks N1 and N6 in the data receiver by setting a threshold value. Thus, the threshold value for the distribution of correlation peaks which is shown in FIG. 3a may be set to, or specified to have, the value of "two", whereas for the distribution of correlation peaks which is shown in FIG. 3b, a threshold value of the value of "2" is already reached by the secondary peaks N3 and N4. For the distribution of correlation peaks which is shown in FIG. 3, the threshold value would have to be set to, or specified to have, the value of "2.5", which would result in a threshold value increased by a factor of 1.25.

Due to the use of three ML sequences of the length m, resulting reference sequences having lengths not divisible by two may additionally be generated. If, for example, a training sequence and/or reference sequence may be used which is longer than 127 bits (corresponding to $2^7-1$), the next ML sequence in length would already be 255 bits (corresponding to $2^8-1$) in length. Utilization of three ML sequences of the length 63 (corresponding to $2^6-1$) results in a reference sequence of the length 189, i.e., a length which is half-way between the ML sequences of lengths of 127 bits and 255 bits. Due to the subdivision of the reference sequence, same behaves similarly to an imagined ML sequence of the length of 3*m with a correlation peak, or main peak, H and small secondary peaks N1 to N6.

Figure 4B:
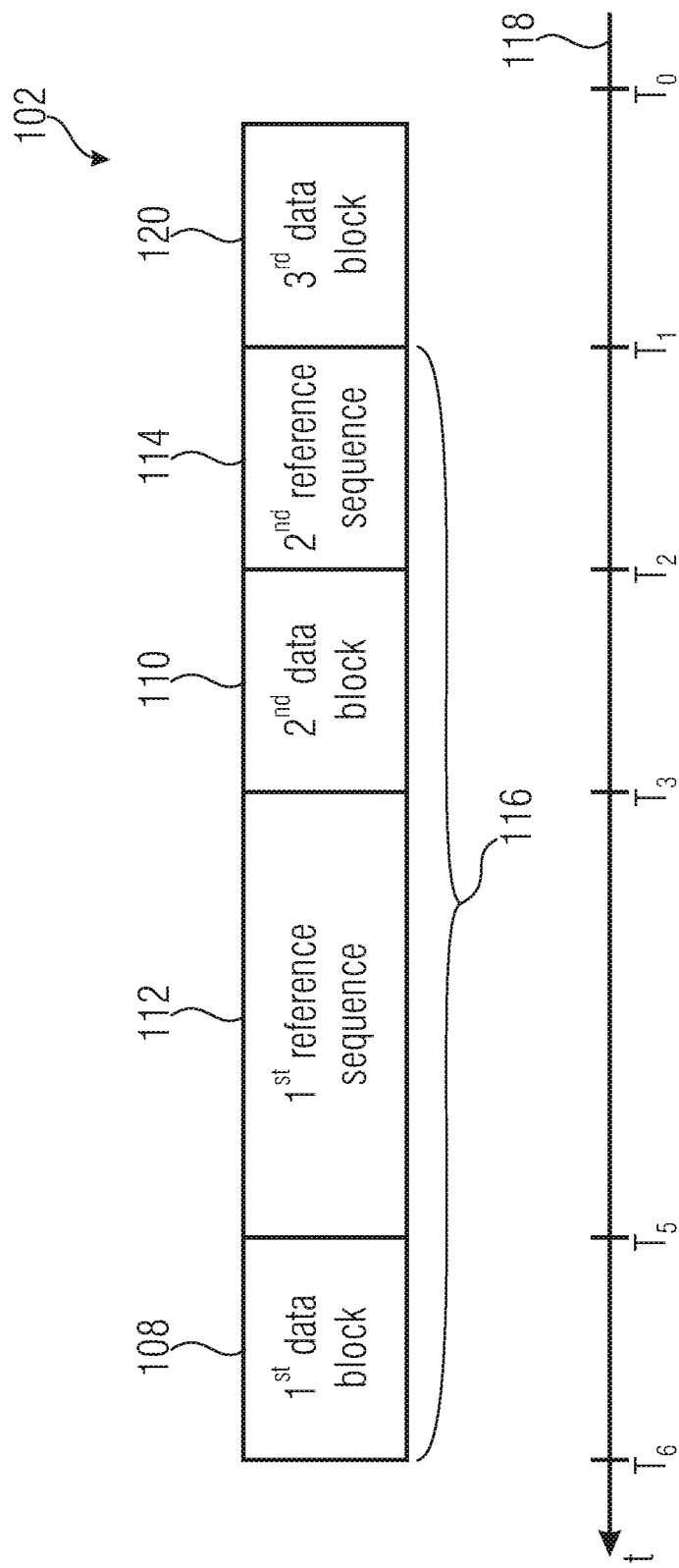
FIGS. 4a, b show two embodiments of the data packets transmitted by the data transmitter and having a third data block, in schematic views in each case.

In schematic views, FIGS. 4a and 4b show two embodiments of the data packets 102 transmitted by the data transmitter 100, the data packets 102 each having a third data block. The data packets 102 shown in FIGS. 4a and 4b thus correspond to the data packet 102 of FIG. 2a, which comprises an additional third data block 120. The means 104 for generating a data packet 102 may be configured to provide a third data block in the data packet 102.

In the data packet 102, the third data block 120 may be located, as is shown in FIG. 4a, at a data packet end between times $T_5$ and $T_6$, whereas that part of the data packet 102 which is known from FIG. 2a extends from time $T_0$ to $T_5$. Alternatively, the third data block 120 may be located, in the data packet 102, at a data packet start between times $T_0$ and $T_1$. Accordingly, the second reference sequence 114 is located between times $T_1$ and $T_2$, and the data packet core area 116 extends from time $T_2$ to $T_6$. Moreover, the means 104 for generating the data packet 102 may be configured to provide n further data blocks in the data packet. Starting from the data packet core area 116, the n data blocks may be arranged with increasing values of n from the data packet core area 116, on the time axis 118 to the right, left or alternately to the right and to the left of the data packet core area 116 and the second reference sequence 114.

Figure 5:
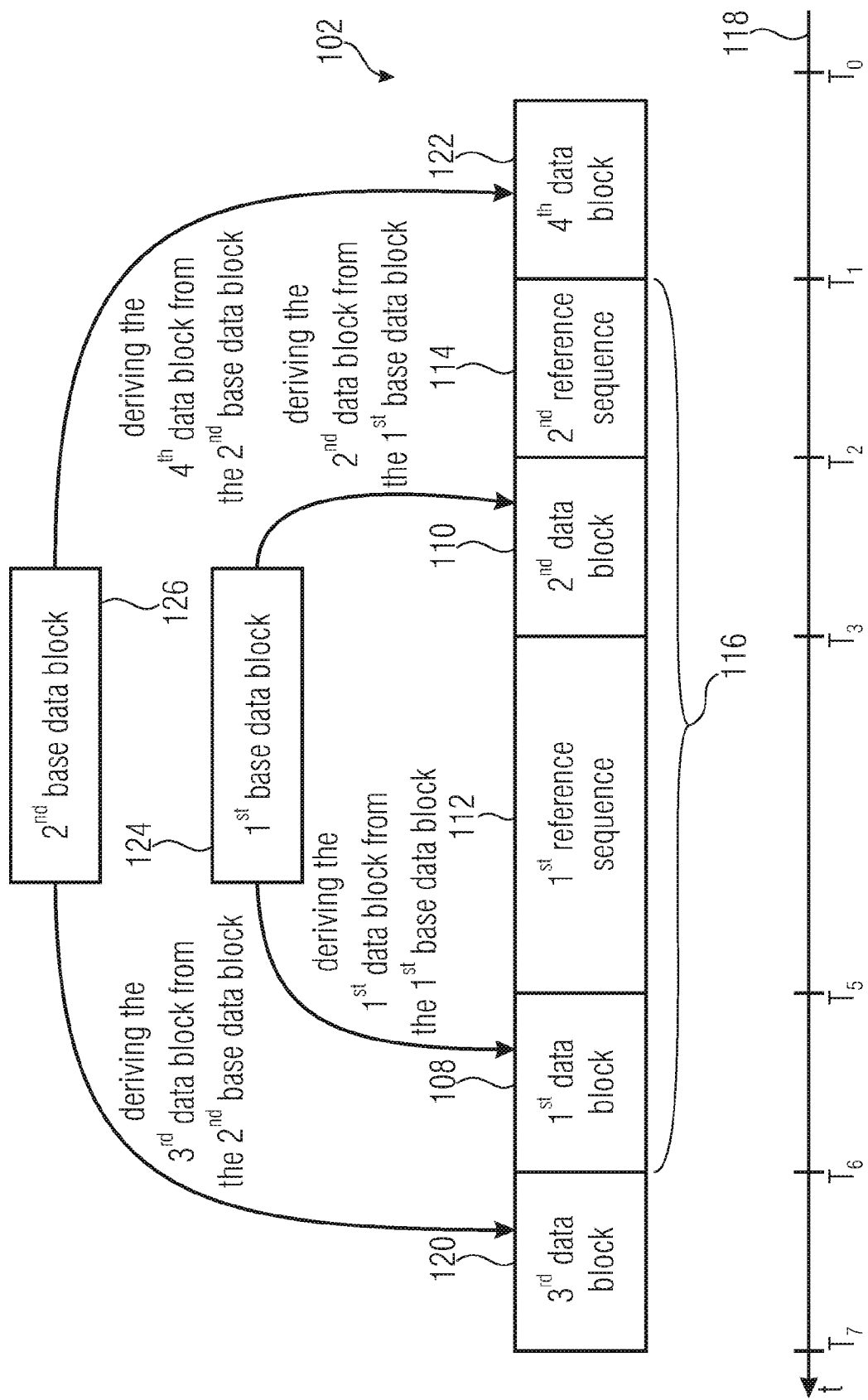
FIG. 5 shows a schematic view of an embodiment of a method of generating a data packet from a first base data block and a second base data block.

FIG. 5 shows a schematic view of an embodiment of a method of generating a data packet 102 from a first base data block 124 and a second base data block 126. In a first step, the first data block 108 and the second data block 110 may be derived from the first base data block 124 and be provided, in the data packet 102, on the time axis 118 to the right and the left of the first reference sequence 112. The first reference sequence may be located, accordingly, between times $T_3$ and $T_5$ in the data packet 102 shown in FIG. 5, whereas the first data block 108 may be located between times $T_5$ and $T_6$, and the second data block 110 may be located between times $T_2$ and $T_3$. The second reference sequence 114 may be provided, in the data packet, between times $T_1$ and $T_2$. In a second step, the third data block 120 and the fourth data block 122 may be derived from the second base data block 126. In this context, the third data block 120 may be provided between times T6 and T7, and the fourth data block may be provided between times T0 and T1 in the data packet 102.

Moreover, the means 104 for generating the data packet 102 may be configured to perform the method shown in FIG. 5. The means for generating the data packet 102 may be configured to derive the first data block 108 and the second data block 110 of the data packet 102 from a first base data block 124. In addition, the means 104 for generating the data packet may be configured to derive a third data block 120 and a fourth data block 122 from a second base data block 126 so as to provide the third data block 120 and the fourth data block 122 in the data packet 102, the third data block 120 being located, in the data packet 102, at a data packet end, and the fourth data block 122 being located, in the data packet 102, at a data packet start. The means 104 for generating the data packet may obtain the base data blocks, e.g., the first base data block 124 and the second base data block 126, directly or in the form of payload data. In addition, the means for generating the data packet 102 may be configured to process the payload data so as to obtain a data packet 102 comprising corresponding data blocks.

Figure 6:
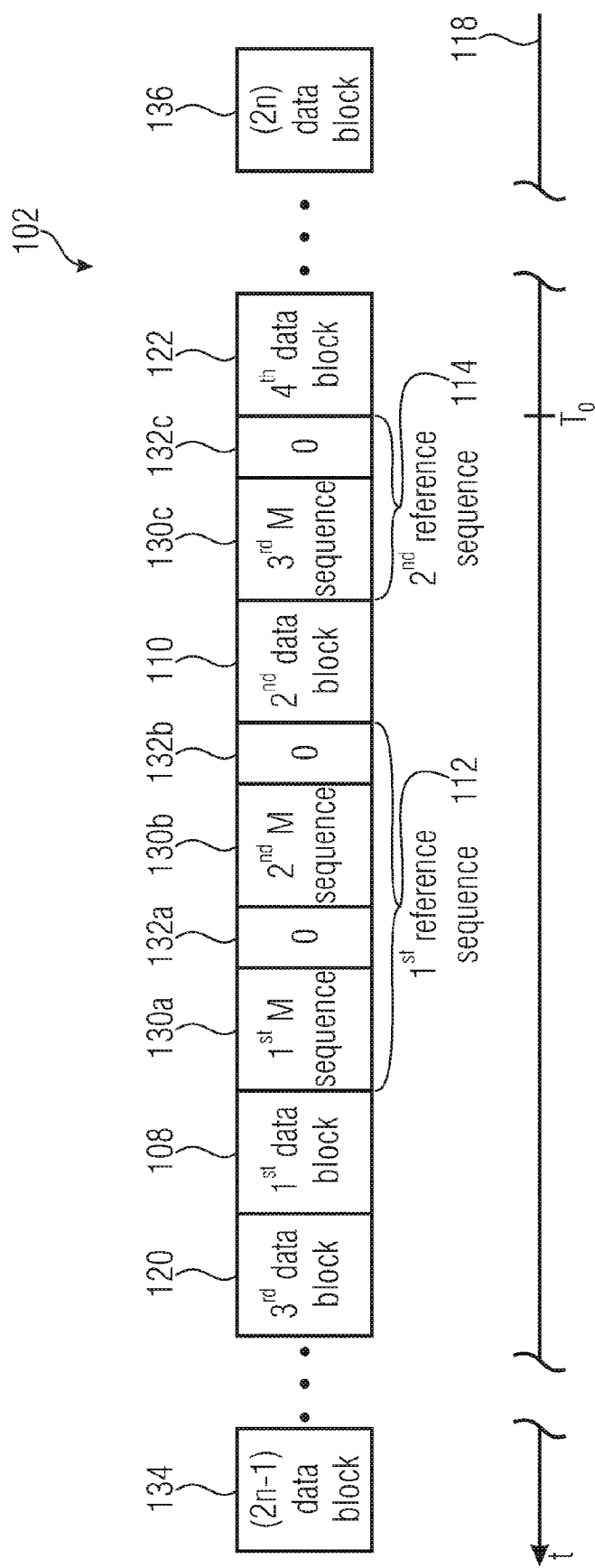
FIG. 6 shows a schematic view of an embodiment of a data packet transmitted by the data transmitter, the first reference sequence comprising two ML sequences each having a binary element, and the second reference sequence comprising an ML sequence having a binary element.

FIG. 6 shows a schematic view of an alternative embodiment of a data packet 102 transmitted by the data transmitter 100, the first reference sequence 112 comprising two ML sequences 130a and 130b, each having one binary element 132a and 132b, respectively, and the second reference sequence 114 comprising one ML sequence 130c having one binary element 132c. Thus, the first reference sequence 112 is subdivided into a first reference subsequence 112a and a second reference subsequence 112b, which are identical with the second reference sequence 114. The three ML sequences 130a to 130c have binary elements 132a to 132b added to them, respectively, the binary element 132a to 132c each being a binary zero in the data packet 102 shown in FIG. 6. Alternatively, the binary element 132a to 132c may be, e.g., a binary one and/or may temporally precede the respective ML sequence 130a to 130c.

Furthermore, the means 104 for generating the data packet 102 may be configured to provide further (2*n) data blocks in the data packet 102, so that the data packet 102 shown in FIG. 6 comprises further (2*n) data blocks. In this context, a $(2*n-1)^{th}$ data block 134 and a $(2*n)^{th}$ data block 136 may be derived from an $n^{th}$ base data block, the $(2*n-1)^{th}$ data block 134 being located, in the data packet 102, at the data packet end, and the $(2*n)^{th}$ data block 136 being located, in the data packet 102, at the data packet start (or vice versa). It shall also be noted that the means for generating the data packet 102 may be configured, as was already described with reference to FIG. 4a, to generate a data packet having n data blocks.

Figure 7:
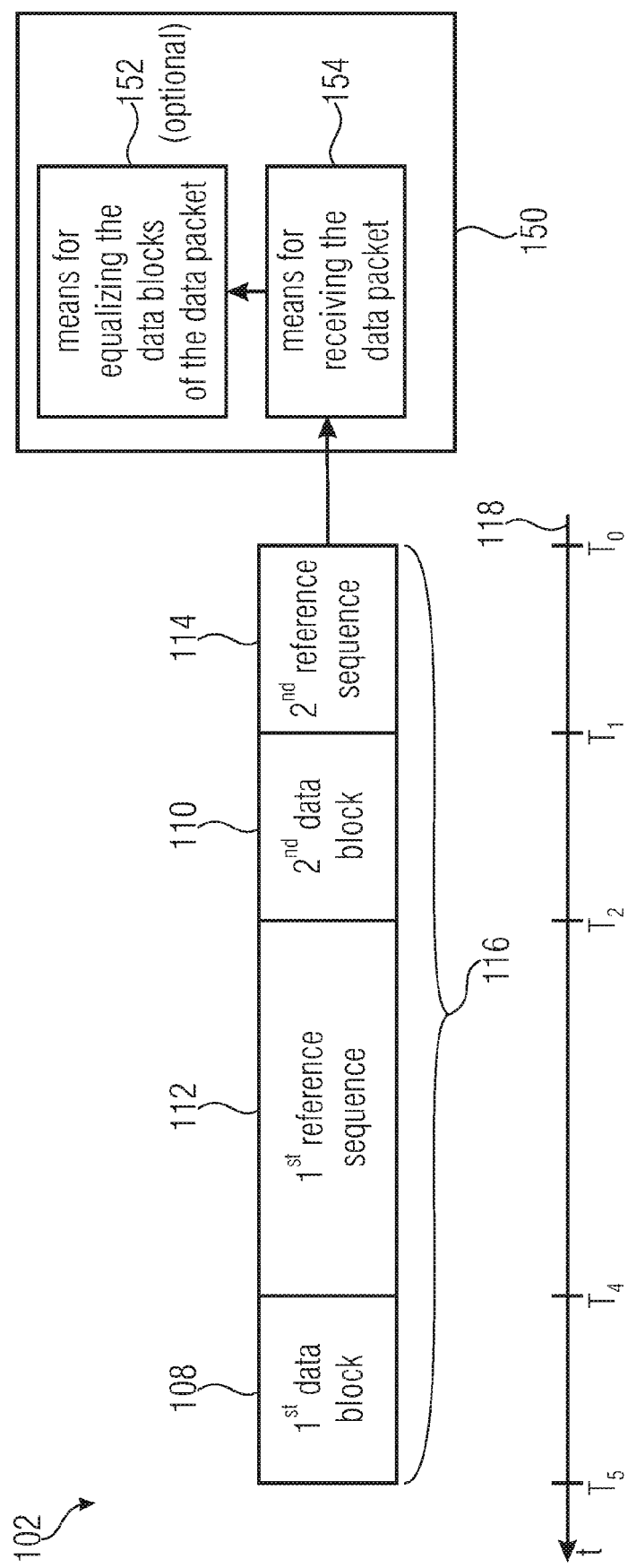
FIG. 7 shows a schematic view of an embodiment of a data receiver and of a data packet received by the data receiver.

FIG. 7 shows a schematic view of an embodiment of a data receiver 150 as well as of a data packet 102 received by the data receiver 150. The data receiver 150 is configured to receive a data packet from a data transmitter 100 via a communication channel. The data packet 102 comprises a first data block 108 and a second data block 110 and a predefined first reference sequence 112 and second reference sequence 114 for synchronizing the data receiver 150 and for equalizing the received data packet which is disturbed by the communication channel; in the data packet 102, the second data block 110 is located between the first reference sequence 112 and the second reference sequence 114, and the first reference sequence 112 is located between the first data block 108 and the second data block 110. The data receiver 150 comprises a means 152 for receiving the data packet 102, said means being configured to localize the first reference sequence 112 and the second reference sequence 114 of the data packet 102 in the receive data stream, and to determine the data packet 102 on the basis of a determinable transmission parameter which may be derived from the first reference sequence 112 and from the second reference sequence 114. The transmission parameter may be a frequency, a frequency shift, a phase, a phase shift, a group run time, or a frequency-dependent attenuation of the communication channel.

The means 154 for receiving the data packet 102 may receive the receive data stream via an interface, e.g., an antenna, the means 154 for receiving the data packet 102 being configured to localize the data packet 102, or, in particular, the first reference sequence 112 and the second reference sequence 114 of the data packet 102 in the receive data stream.

In one embodiment, the means 154 for receiving the data packet 102 may be configured to correlate the receive data stream with the first reference sequence 112 and with the the second reference sequence 114, which are known to the data receiver 150, so as to localize the first reference sequence 112 and the second reference sequence 114 of the data packet 102 in the receive data stream. In addition, following localization of the first reference sequence 112 and of the second reference sequence 114, the data packet 102 may be determined, or obtained, on the basis of a determinable transmission parameter. Furthermore, the means 154 for receiving the data packet may be configured to determine the transmission parameter on the basis of a frequency estimation of a phase estimation. In embodiments, the transmission parameter may thus be a frequency, or carrier frequency, at which the data packet 102 was transmitted from the data transmitter 100 to the data receiver 150 via the communication channel, or may be a phase or phase shift between the data transmitter 100 and the data receiver 150.

For synchronization with the data packet 102, the data receiver 150 may thus localize the first reference sequence 112 and the second reference sequence 114 in the receive data stream, and may determine, e.g. on the basis of a comparison between the received first and second reference sequences and the known first and second reference sequences 112 and 114, the transmission parameter, e.g., a carrier frequency by means of which the data packet 102 was transmitted via the communication channel.

The inventive data transmitter 100 and/or data receiver 150 exhibit advantages, in particular, in such radio transmission systems wherein data packets 102 may be detected at low signal-to-noise ratios, but need not necessarily be fully decoded. This is the case, e.g., in radio transmission systems comprising code combining, wherein payload data is differently coded and is sent out as data packets 102 at different times. In the data receiver 150, a high code gain may result from combining the differently encoded data packets 102, i.e., the useful information (payload) may still be decoded even at very low signal-to-noise ratios. To make this possible, the burst-type data packets 102 may be found, or located, in the receive data stream, i.e., the data receiver 150 may be able to synchronize itself to a received data packet and to equalize channel effects.

The data receiver 150 may further comprise a means 152 for equalizing the data blocks of the data packet 102, said means being configured to perform equalization for the first data block 108 on the basis of the first reference sequence 112 so as to obtain an equalized first data block, and to perform equalization for the second data block 110 on the basis of the first reference sequence 112 or of a reference subsequence adjacent to the second data block 110, and of the second reference sequence 114 so as to obtain an equalized second data block. The mode of operation of the means 152 for equalizing the data blocks of the data packet 102 will be explained in more detail below in the embodiment shown in FIG. 8.

Figure 8:
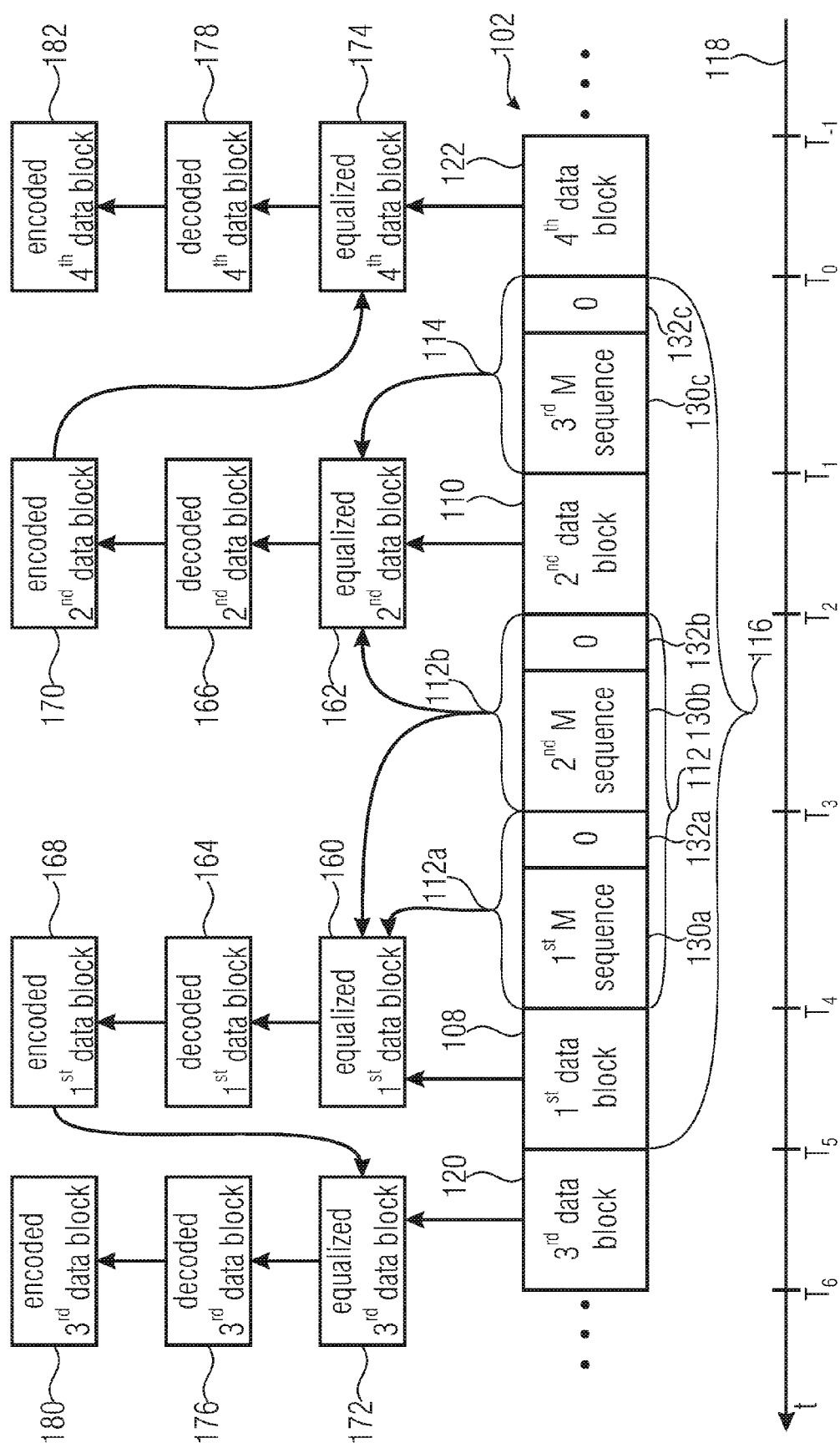
FIG. 8 shows a schematic view of an embodiment of a method of equalizing the data blocks of a data packet.

FIG. 8 shows a schematic view of an embodiment of a method of equalizing the data blocks of a data packet 102. Equalization may be a correction of a frequency shift, phase shift, or channel equalization which is caused, e.g., in the transmission of the data packet 102 from the data transmitter 100 to the data receiver 150 via the communication channel. The data packet 102 shown in FIG. 8 corresponds to the data packet 102 of FIG. 6, wherein the first reference sequence 112 is subdivided into a first reference subsequence 112a and a second reference subsequence 112b, and wherein the first reference subsequence 112a and the second reference subsequence 112b are identical with the second reference sequence 114, and wherein the first reference subsequence 112a, the second reference subsequence 112b, and the second reference sequence 114 comprise ML sequences 130a to 130c as well as a binary element 132a to 132c, respectively.

In accordance with the invention, the first reference sequence 112 and the second reference sequence 114 may be used not only for synchronizing the data receiver 150, i.e., for localizing the first and second reference sequences 112 and 114 in the receive data stream and for determining the transmission parameter, but in addition also for channel equalization of the first base data block 124, or of the first data block 108, and the second data block 110. Since the reference sequences 112 and 114 are spaced apart and/or are separated from each other by means of a data block, frequency estimation may be performed with a small estimation error. In addition, the frequency and phase estimation or an estimation of a different transmission parameter may be performed separately for the first data block 108 and for the second data block 110. Thus, synchronization or equalization may be performed on the basis of the knowledge of the transmission parameter.

The phase estimation for the first data block 108 may be averaged over the first reference subsequence 112a and the second reference subsequence 112b and/or over the first ML sequence 130a having the binary element 132a and the second ML sequence 130b having the binary element 132b. Thus, a long known training sequence and/or reference sequence is available for the phase estimation of the first data block 108, whereby a higher estimation accuracy may be achieved. The estimation for the second data block 110 is effected while using the second reference subsequence 112b and the second reference sequence 114 and/or while using the second ML sequence 130b having the binary element 132b and the third ML sequence 130c having the binary element 132c. Thus, two reference sequences are available also for the phase estimation of the second data block 110, whereby the estimation accuracy can be increased.

For decoding n further base data blocks, which are divided and are joined, at the data packet start and data packet end, respectively, to the transmit telegraph and/or to the data packet core area 116, no further reference sequence is required for equalization as well as frequency and phase estimation. For equalizing the $n^{th}$ base data block, the information of a correctly decoded preceding base data block, e.g., of the $(n-1)^{th}$, $(n-2)^{th}$ or $(n-3)^{th}$ base data block, may be used in accordance with the invention, the information of the correctly decoded $(n-1)^{th}$ (i.e., immediately preceding) base data block being used in an advantageous embodiment. Alternatively, one may also use the information of several preceding correctly decoded base data blocks. The information of the data blocks is thus re-encoded and compared to the receive sequence. The channel equalizations, e.g. frequency and phase shift, may be determined from a difference or a comparison between the encoded information and the receive sequence, that is, between the re-encoded or newly encoded data block and the received data block. The individual data blocks are encoded by themselves and may be used, following decoding and encoding or re-encoding, again as references for equalizing further data blocks in the data packet 102. Thus, there is the possibility of decoding the data blocks while starting at the first reference sequence 112, and of subsequently encoding or re-encoding same. The encoded data blocks may be used as reference data for channel estimation, frequency estimation, phase estimation or SNR estimation. Neighboring data blocks may therefore be decoded with the time-variable parameters. This design of the slots and/or of the arrangement of the data blocks in the data packet 102 enables tracking of the parameter estimation over time and, thus, adaptation to a time-variable channel or transmission channel. Due to the inventive design of the data packet 102, known reference sequences within the data blocks that may be used specifically for parameter estimation are not necessary.

In embodiments, error propagation during decoding and re-encoding of a data packet 102 with subsequent parameter estimation has no repercussions since only error-free data packets 102 or data blocks are processed further. The absence of errors in a data packet 102 or in a data block may be ascertained, e.g., by means of a CRC check sum. The CRC check sum may be calculated over one data block, over several data blocks or over the entire data packet 102. In addition, each data block may comprise one or more CRC bits, so that decoding may be aborted as early as at the occurrence of a first corrupt data block so as to save computing time, for example. If a data packet 102 cannot be decoded in a completely error-free manner, this data packet may be combined, when using code combining, with a different data packet 102 of the same transmitter that was sent out, e.g., at a later point in time. With combined data packets 102, equalization and decoding may also be effected in an iterative manner. Alternatively, any correctly decodable data blocks of the data packet 102 may be used immediately, whereas the non-correctly decodable data blocks are temporarily stored (latched) and are decoded at a later point in time while using code combining, or by combining them with a further or different data packet 102 of the same transmitter that was sent out, e.g., at a later point in time.

Additionally, it is also possible for data blocks to be coded differently. For example, data blocks which are temporally closer to the first reference sequence 112 may be put under higher protection and/or be provided with more redundance so as to be able to correctly decode said data blocks without code combining with a higher probability than those data blocks that are temporally located further apart from the first reference sequence 112. This may be exploited for correctly decoding important information as early as at reception of a data packet 102 without having to wait for a further data packet 102 in order to be able to perform code combining.

The means 152 for equalizing the data blocks of the data packet 102 may further be configured to perform the above-described inventive method shown in FIG. 8. The means 152 for equalizing the data blocks of the data packet 102 may be configured to perform equalization for the first data block 108 on the basis of the first reference subsequence 112a and of the second reference subsequence 112b so as to obtain an equalized first data block 160. The second data block 110 may be equalized on the basis of the second reference subsequence 112b and of the second reference sequence 114 so as to obtain an equalized second data block 162. Equalization for the first data block 108 and the second data block 110 may be effected while using a frequency estimation, phase estimation or channel estimation.

In addition, the means 152 for equalizing the data blocks may be configured to decode the equalized first data block 160 and the second data block 162 so as to obtain a decoded first data block 164 and second data block 166. If it was possible to correctly decode the equalized first data block 160, i.e., if the decoded first data block 164 comprises valid information, this information may be re-encoded so as to be used as a reference sequence for equalizing the third data block 120. By analogy, the information of a correctly decoded second data block may be used for equalizing a fourth data block 122. Moreover, the means 152 for equalizing the data blocks may be configured to encode the decoded first data block 164 or second data block 166 so as to obtain an encoded first data block 168 or second data block 170.

In addition, the means 152 for equalizing the data blocks may be configured to perform equalization for a first data block 108 and a second data block 110, the first data block 108 and the second data block 110 being derived from a first base data block 124.

Additionally, the means for equalizing the data blocks of the data receiver may be configured to decode the equalized first data block and second data block so as to obtain a decoded first data block and second data block. Moreover, the means for equalizing the data blocks of the data receiver may be configured to encode the decoded first data block or second data block so as to obtain an encoded first data block or second data block. Equalization for a third data block may be performed on the basis of the encoded first data block if the first data block in the data packet has a smaller temporal distance from the third data block than does the second data block. Alternatively, equalization for the third data block may be performed on the basis of the encoded second data block if the second data block in the data packet has a smaller temporal distance from the third data block than does the first data block. Also, equalization for a fourth data block may be performed on the basis of the encoded first data block if the first data block in the data packet has a smaller temporal distance from the fourth data block than does the second data block. Alternatively, equalization for the fourth data block may be performed on the basis of the encoded second data block if the second data block in the data packet has a smaller temporal distance from the fourth data block than does the first data block. In addition, the third data block and the fourth data block may be derived from a second base data block, the third data block in the data packet being located at a data packet end, and the fourth data block in the data packet being located at a data packet start. Equalization for the third data block 120 and the fourth data block 122 may also be effected while using a frequency estimation, phase estimation or channel estimation.

Furthermore, an equalized third data block 172 and an equalized fourth data block 174 may be decoded so as to obtain a decoded third data block 176 and a decoded fourth data block 178. The decoded third data block 176 and the decoded fourth data block 178 may subsequently be encoded so as to obtain an encoded third data block 180 and an encoded fourth data block 182. The means 152 for equalizing the data blocks may be configured to perform equalization for a fifth data block (not shown) on the basis of the encoded third data block 180 and to perform equalization for a sixth data block (not shown) on the basis of the encoded fourth data block 182.

Equalization of a third data block 120 may be effected in accordance with the embodiment, shown in FIG. 4a or 4b, of a data packet 102. The means 152 for equalizing the data blocks may be configured to perform equalization for the third data block 120 on the basis of the encoded first data block 168 if the first data block 108 in the data packet 102 has a smaller temporal distance from the third data block 120 than does the second data block 110, or to perform equalization for the third data block 120 on the basis of the encoded second data block 170 if the second data block 110 in the data packet 102 has a smaller temporal distance from the third data block 120 than does the first data block 108, the third data block 120 in the data packet 102 being located at a data packet start or data packet end. Equalization for the third data block 120 may be effected while using a frequency estimation, phase estimation or channel estimation.

The inventive concept shall be described once again in summary below.

The present invention addresses synchronization and equalization of channel-coded data packets 102 in a radio transmission system, e.g., with code combining. In a radio transmission wherein the transmission reliability is to be increased with the aid of code combining in that redundant information in several different data packets 102 is transmitted at different times, it is useful to detect the individual data packets 102 even when the signal-to-noise ratio (SNR) is very low and does not suffice for decoding the individual packet or data packet 102. Depending on the code gain due to the combination of several receive packets or data packets 102, the signal-to-noise ratio which may be used at the receiver or data receiver 150 and at which the data can still be detected decreases. So that this code gain can be realized, it may be possible to find and even partly (even if erroneously, for example) decode the individual data packets 102 at this low signal-to-noise ratio. For finding and partly decoding the individual data packets 102, synchronization and equalization are therefore useful. Embodiments of the invention therefore describe a method of synchronizing individual burst-type transmission packets or data packets 102 in a radio transmission system (e.g. with code combining) without it being mandatory to be able to fully decode the individual packet or data packet 102.

For synchronization, the reference sequence or training sequence is split up into two parts 112 and 114 which are different in size and are separated by a data block 110. In addition, a first base data block 124 is equalized with the aid of the training sequence and/or reference sequence, wherein, additionally, a frequency and phase estimation may be effected by the training sequence and/or reference sequence 112 and 114. Further base data blocks are equalized with the aid of the previously received re-encoded base data block, it being possible for a frequency and phase estimation to be effected by the correctly received data.

For synchronization in the receiver or data receiver 150, a training sequence and/or reference sequence is typically used in the transmission of a burst-type transmit packet or data packet. In the present invention, the training sequence and/or reference sequence is structured as is shown in FIG. 6 and as will be described below. The training sequence or reference sequence is subdivided, e.g., into three identical subsequences. Said subsequences are, e.g., maximum length sequences (ML sequences) 130a to 130c having the length ($2^m-1$), which are extended by one bit (zero bit) 132a to 132c. They are not transmitted successively, but in two fragments 112 and 114. For example, two ML sequences 130a and 130b of identical length are combined, and are separated from the third ML sequence 130c of identical length by a data block 110 and/or by part of the first base data block 124. The second part of the first base data block 124 is arranged on the other side of the pair of ML sequences, so that the base data block 124 will be located to the left and right of the ML sequence tuple 130a and 130b. Subdivision of the base data block is (ideally) effected, e.g., such that it yields two parts identical in size. Equivalent subdivision is not mandatory.

Extension of the ML sequences 130a to 130c by one bit was effected since the bits are modulated, e.g., with a ($2^n$)-stage modulation, for example with a (non-differential) MSK modulation. If a sequence consists of an even number of bits, that bit which follows said sequence will be mapped to the same axis of the constellation diagram as the first bit of the first sequence. By means of the even number of bits in the first training sequence and/or reference sequence 112 and 114 as well as of the data block 110 located between the training sequences and/or reference sequences 112 and 114, one achieves that all of the training sequences and/or reference sequences 112 and 114 have the same constellation points following modulation. The complex baseband representation therefore contains three identical training sequence portions and/or reference sequence portions.

For simple implementation into, e.g., a microcontroller, the length of the data blocks or base data blocks which belong together is selected to be, e.g., an integer multiple of 8 bits. The extension of the ML sequences by 1 bit correspondingly results in that e.g. a training sequence is exactly 4 bytes in length.

Due to the subdivision of the training sequences and/or reference sequences into two pieces separated from data or from a data block 110, secondary peaks, which are smaller in terms of amount as compared to three successive training sequences, are yielded in the synchronization. Additionally, the secondary peaks have the same amount. Without the last training sequence 114, secondary peaks of increasing sizes would arise, as may be seen in FIG. 3b. FIG. 3a, by contrast, shows a schematic representation of the correlation function peaks with a separated third training sequence 114. One can see that all of the secondary peaks N1 to N6 have the same amplitudes. The main peak H has three times the height relative to the secondary peaks N1 to N6. By means of this arrangement, the main peak H in the receiver or data receiver 150 may easily be distinguished or separated from the secondary peaks N1 to N6 by setting a threshold value.

Due to the use of three ML sequences of the length ($2^m-1$), one can also generate resulting training sequences and/or reference sequences 112 and 114 having lengths not divisible by 2. If, for example, a sequence which is longer than 127 bits (corresponding to $2^7-1$) is used, the next ML sequence in length would already be 255 bits (corresponding to $2^8-1$) in length. Utilization of 3 ML sequences of the length 63 (corresponding to $2^6-1$) results in a training sequence and/or reference sequence of the length 189, i.e., a length which is half-way between both lengths of ML sequences. Due to the subdivision of the sequence, same behaves similarly to an imagined ML sequence of the length of $3*(2^m-1)$ with a correlation peak and small secondary values.

In the inventive approach, the training sequence is subdivided so as to exploit it simultaneously for channel equalization of the first base data block 124. Since the training sequences and/or reference sequences 112 and 114 are spaced apart, frequency estimation may be performed with a smaller estimation error. The frequency and phase estimation may be performed separately for both parts of the first base data block 124, i.e. for the first data block 108 and the second data block 110.

The phase estimation for the first data block 108 may be averaged over the first ML sequence 130a and the second ML sequence 130b. Thus, a long known sequence 112 is available for the first phase estimation, whereby a higher estimation accuracy may be achieved. The estimation for the second data block 110 is effected while using the second ML sequence 130b and the third ML sequence 130c. Thus, 2 training sequences and/or reference sequences are available also for this phase estimation, whereby the estimation accuracy can be increased. For decoding further base data blocks n, which are divided and are joined, on the left and right, respectively, to the transmit telegraph, no further training sequence is used for equalization as well as frequency and phase estimation. For equalizing the $n^{th}$ base data block, the information of the correctly coded base data block n−1 is used. Said information is re-encoded and compared to the receive sequence. The channel equalizations and the frequency and phase shift may be determined from the difference between the encoded information and the receive sequence. The individual data blocks are encoded by themselves and may be used, following decoding and re-encoding, again as references for equalizing further data blocks in the data packet 102. Thus, there is the possibility of decoding the data blocks while starting at the ML sequence, and of subsequently re-encoding same. The encoded blocks may be used as reference data for channel estimation, frequency estimation, phase estimation or SNR estimation. Neighboring data blocks may be decoded with the time-variable parameters. This design of the slots enables tracking of the parameter estimation over time and, thus, adaptation to a time-variable channel. Due to this data packet design, known training sequences and/or reference sequences within the data blocks that may be used specifically for parameter estimation are not necessary. Error propagation during decoding and re-encoding of a data packet 102 with subsequent parameter estimation has no repercussions in this system since only error-free data packets 102 are processed further. If a data packet 102 cannot be decoded in a completely error-free manner, this data packet 102 may be combined, when using code combining, with a different data packet 102 of the same transmitter or data transmitter 100 that was sent out, e.g., at a later point in time (code combining). With these combined data packets 102, equalization and decoding may then also be effected in an iterative manner.

Additionally, it is possible for data blocks to be coded differently. For example, data blocks which are located closer to the training sequence and/or reference sequence might be put under higher protection so as to correctly decode said data without code combining with a higher probability than the outer data. This may be exploited for correctly decoding important information as early as at reception of a data packet 102 without having to wait for a further data packet 102 in order to be able to perform code combining. Due to the specific subdivision of the training sequence, the method described enables achieving both good phase and frequency estimations for channel equalization while obtaining good correlation properties therewith so as to detect data packets 102, in particular with radio transmission systems with code combining, from the noise, even if they are only partly decodable. Iterative decoding enables iterative tracking the phase and frequency estimations while starting from the training sequence in the center of the data packet 102 in and outward manner. To this end, the actual data is used as the training sequence.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed. Generally, embodiments of the present invention may be implemented as a computer program product having a program code, the program code being effective to perform any of the methods when the computer program product runs on a computer.

The program code may also be stored on a machine-readable carrier, for example. Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet. A further embodiment includes a processing means, for example a computer or a programmable logic device, configured or adapted to perform any of the methods described herein. A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

According to one aspect, a data transmitter for transmitting a data packet to a data receiver via a communication channel comprises a means for generating the data packet having a first data block and a second data block and a predefined first reference sequence and second reference sequence for synchronizing the data packet in the data receiver, wherein the first reference sequence is longer than the second reference sequence, and wherein in the data packet, the second data block is located between the first reference sequence and the second reference sequence, and the first reference sequence is located between the first data block and the second data block;

and a means for transmitting the data packet to the data receiver via the communication channel.

The means for generating the data packet may further be configured to provide, in the data packet, the first reference sequence to be double the length of the second reference sequence.

The means for generating the data packet may further be configured to subdivide, in the data packet, the first reference sequence into a first reference subsequence and a second reference subsequence, the first reference subsequence and the second reference subsequence each having the length of the second reference sequence.

The means for generating the data packet may further be configured to generate a data packet wherein the first reference subsequence, the second reference subsequence and the second reference sequence are identical.

According to a further aspect, the means, of the data transmitter, for generating the data packet may be configured to provide, in the data packet, the first reference sequence and the second reference sequence as pseudorandom sequences or ML sequences.

The means for generating the data packet may further be configured to provide, in the data packet, the first reference subsequence, the second reference subsequence, and the second reference sequence as ML sequences, respectively, each having an additional binary element.

According to a further aspect, the means, of the data transmitter, for generating the data packet may be configured to provide a third data block in the data packet, the third data block in the data packet being located at a data packet start or a data packet end.

According to a further aspect, the means, of the data transmitter, for generating the data packet may be configured to derive the first data block and the second data block of the data packet from a first base data block.

The means for generating the data packet may further be configured to derive a third data block and a fourth data block from a second base data block and to provide the third data block and the fourth data block in the data packet, the third data block in the data packet being located at a data packet end, and the fourth data block in the data packet being located at a data packet start.

According to another aspect, a data receiver for receiving a data packet from a data transmitter via a communication channel, the data packet comprising a first data block and a second data block and a predefined first reference sequence and second reference sequence for synchronizing the data receiver, wherein, in the data packet, the first data block is located between the first reference sequence and the second reference sequence, and the first reference sequence is located between the first data block and the second data block, comprises a means for receiving the data packet, said means being configured to localize the first reference sequence and the second reference sequence of the data packet in the receive data stream and to determine the data packet on the basis of a determinable transmission parameter which may be derived from the first reference sequence and from the second reference sequence.

The means for receiving the data packet may further be configured to correlate the receive data stream with the first reference sequence and with the second reference sequence, which are known to the data receiver, so as to localize the first reference sequence and the second reference sequence of the data packet in the receive data stream.

The means for receiving the data packet may further be configured to determine the transmission parameter on the basis of a frequency estimation or a phase estimation.

The means for equalizing the data blocks of the data packet may further be configured to perform equalization for the first data block on the basis of the first reference sequence so as to obtain an equalized first data block, and to perform equalization for the second data block on the basis of the first reference sequence or of a reference subsequence adjacent to the second data block and of the second reference sequence so as to obtain an equalized second data block.

The means for equalizing the data blocks may further be configured to perform the equalization for the first data block and the second data block while using a frequency estimation, phase estimation or channel estimation.

The means for equalizing the data blocks may further be configured to decode the equalized first data block and second data block so as to obtain a decoded first data block and second data block.

The means for equalizing the data blocks may further be configured to encode the decoded first data block or second data block so as to obtain an encoded first data block or second data block.

The means for equalizing the data blocks may further be configured to perform equalization for a third data block on the basis of the encoded first data block if the first data block in the data packet has a smaller temporal distance from the third data block than does the second data block, or to perform equalization for the third data block on the basis of the encoded second data block if the second data block in the data packet has a smaller temporal distance from the third data block than does the first data block, the third data block being located, in the data packet, at a data packet start or data packet end.

The means for equalizing the data blocks may further be configured to perform the equalization for the third data block while using a frequency estimation, phase estimation or channel estimation.

The means for equalizing the data blocks may further be configured to perform equalization for a first data block and a second data block, the first data block and the second data block being derived from a first base data block.

The means for equalizing the data blocks may further be configured to perform equalization for a third data block on the basis of the encoded first data block if the first data block in the data packet has a smaller temporal distance from the third data block than does the second data block, or to perform equalization for the third data block on the basis of the encoded second data block if the second data block in the data packet has a smaller temporal distance from the third data block than does the first data block, and to perform equalization for a fourth data block on the basis of the encoded first data block if the first data block in the data packet has a smaller temporal distance from the fourth data block than does the second data block, or to perform equalization for the fourth data block on the basis of the encoded second data block if the second data block in the data packet has a smaller temporal distance from the fourth data block than does the first data block, the third data block and the fourth data block being derived from a second base data block, the third data block in the data packet being located at a data packet end, and the fourth data block in the data packet being located at a data packet start.

The means for equalizing the data blocks may further be configured to perform equalization for the third data block and the fourth data block while using a frequency estimation, phase estimation or channel estimation.

According to another aspect, a method of transmitting a data packet to a data receiver via a communication channel comprises generating the data packet having a first data block and a second data block and a predefined first reference sequence and second reference sequence for synchronizing the data receiver, wherein the first reference sequence is longer than the second reference sequence, and wherein in the data packet, the first data block is located between the first reference sequence and the second reference sequence, and the first reference sequence is located between the first data block and the second data block; and transmitting the data packet to the data receiver via the communication channel.

According to another aspect, a method of receiving a data packet from a data transmitter via a communication channel, the data packet comprising a first data block and a second data block and a predefined first reference sequence and second reference sequence for synchronizing the data receiver, wherein, in the data packet, the first data block is located between the first reference sequence and the second reference sequence, and the first reference sequence is located between the first data block and the second data block, comprises localizing the first reference sequence and the second reference sequence in the receive data stream; and determining the data packet in the receive data stream on the basis of a determinable transmission parameter which may be derived from the first reference sequence and from the second reference sequence.

The method of receiving a data packet may further be configured such that during localization of the first reference sequence and of the second reference sequence, the receive data stream is correlated with the first reference sequence and the second reference sequence, which are known to the data receiver, so as to localize the first reference sequence and the second reference sequence of the data packet in the receive data stream.

The method of receiving a data packet may further be configured such that during determination of the data packet, the transmission parameter is determined on the basis of a frequency estimation or a phase estimation.

According to another aspect, a computer program may be configured to perform any of the above methods when the computer program runs on a computer or microprocessor.

The invention claimed is:

1. A data receiver for receiving a data packet from a data transmitter via a communication channel, the data packet comprising a first data block and a second data block and a predefined first reference sequence and second reference sequence for synchronizing the data receiver, wherein, in the data packet, the second data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each comprising the length of the second reference sequence, comprising
  a receiver for receiving the data packet, said receiver being configured to localize the first reference sequence and the second reference sequence of the data packet in the receive data stream and to determine the data packet on the basis of a determinable transmission parameter which may be derived from the first reference sequence and from the second reference sequence; and
  an equalizer for equalizing the data blocks of the data packet, said equalizer being configured to perform equalization for the first data block on the basis of the first reference sequence so as to achieve an equalized first data block, and to perform equalization for the second data block on the basis of the first reference sequence or of a reference subsequence adjacent to the second data block and of the second reference sequence so as to achieve an equalized second data block; wherein the equalizer for equalizing the data blocks is configured to perform equalization for a third data block on the basis of the encoded first data block if the first data block in the data packet exhibits a smaller temporal distance from the third data block than does the second data block, or to perform equalization for the third data block on the basis of the encoded second data block if the second data block in the data packet exhibits a smaller temporal distance from the third data block than does the first data block, the third data block being located, in the data packet, at a data packet start or data packet end.

2. The data receiver as claimed in claim 1, wherein the receiver for receiving the data packet is configured to correlate the receive data stream with the first reference sequence and with the second reference sequence, which are known to the data receiver, so as to localize the first reference sequence and the second reference sequence of the data packet in the receive data stream.

3. The data receiver as claimed in claim 1, wherein the receiver for receiving the data packet is configured to determine the transmission parameter on the basis of a frequency estimation or a phase estimation.

4. The data receiver as claimed in claim 1, wherein the equalizer for equalizing the data blocks is configured to perform the equalization for the first data block and the second data block while using a frequency estimation, phase estimation or channel estimation.

5. The data receiver as claimed in claim 1, the equalizer for equalizing the data blocks being configured to decode the equalized first data block and second data block so as to achieve a decoded first data block and second data block.

6. The data receiver as claimed in claim 1, the equalizer for equalizing the data blocks being configured to encode the decoded first data block or second data block so as to achieve an encoded first data block or second data block.

7. The data receiver as claimed in claim 1, wherein the equalizer for equalizing the data blocks is configured to perform the equalization for the third data block while using a frequency estimation, phase estimation or channel estimation.

8. The data receiver as claimed in claim 1, wherein the equalizer for equalizing the data blocks is configured to perform equalization for a first data block and a second data block, the first data block and the second data block being derived from a first base data block.

9. The data receiver as claimed in claim 8, the equalizer for equalizing the data blocks being configured to perform equalization for a fourth data block on the basis of the encoded first data block if the first data block in the data packet exhibits a smaller temporal distance from the fourth data block than does the second data block, or to perform equalization for the fourth data block on the basis of the encoded second data block if the second data block in the data packet exhibits a smaller temporal distance from the fourth data block than does the first data block, the third data block and the fourth data block being derived from a second base data block, the third data block in the data packet being located at a data packet end, and the fourth data block in the data packet being located at a data packet start.

10. The data receiver as claimed in claim 9, wherein the equalizer for equalizing the data blocks is configured to perform equalization for the third data block and the fourth data block while using a frequency estimation, phase estimation or channel estimation.

11. A method of receiving a data packet from a data transmitter via a communication channel, the data packet comprising a first data block and a second data block and a predefined first reference sequence and second reference sequence for synchronizing the data receiver, wherein, in the data packet, the second data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each comprising the length of the second reference sequence, comprising:

localizing the first reference sequence and the second reference sequence in the receive data stream;

determining the data packet in the receive data stream on the basis of a determinable transmission parameter which may be derived from the first reference sequence and from the second reference sequence; and equalizing the data blocks of the data packet, said equalizing including performing equalization for the first data block on the basis of the first reference sequence so as to achieve an equalized first data block, and to performing equalization for the second data block on the basis of the first reference sequence or of a reference subsequence adjacent to the second data block and of the second reference sequence so as to achieve an equalized second data block; wherein the equalizing further includes performing equalization for a third data block on the basis of the encoded first data block if the first data block in the data packet exhibits a smaller temporal distance from the third data block than does the second data block, or performing equalization for the third data block on the basis of the encoded second data block if the second data block in the data packet exhibits a smaller temporal distance from the third data block than does the first data block, the third data block being located, in the data packet, at a data packet start or data packet end.

12. The method of receiving a data packet as claimed in claim 11, wherein during localization of the first reference sequence and of the second reference sequence, the receive data stream is correlated with the first reference sequence and the second reference sequence, which are known to the data receiver, so as to localize the first reference sequence and the second reference sequence of the data packet in the receive data stream.

13. The method of receiving a data packet as claimed in claim 11, wherein during determination of the data packet, the transmission parameter is determined on the basis of a frequency estimation or a phase estimation.

14. A non-transitory computer readable medium including a computer program for performing, when the computer program runs on a computer or microprocessor, the method of receiving a data packet from a data transmitter via a communication channel, the data packet comprising a first data block and a second data block and a predefined first reference sequence and second reference sequence for synchronizing the data receiver, wherein, in the data packet, the second data block is located between the first reference sequence and the second reference sequence, and the first reference sequence is located between the first data block and the second data block, the first reference sequence being double the length of the second reference sequence, and the first reference sequence being subdivided into a first reference subsequence and a second reference subsequence, the first reference subsequence and the second reference subsequence each comprising the length of the second reference sequence, said method comprising:

localizing the first reference sequence and the second reference sequence in the receive data stream;

determining the data packet in the receive data stream on the basis of a determinable transmission parameter which may be derived from the first reference sequence and from the second reference sequence; and equalizing the data blocks of the data packet, said equalizing including performing equalization for the first data block on the basis of the first reference sequence so as to achieve an equalized first data block, and to performing equalization for the second data block on the basis of the first reference sequence or of a reference subsequence adjacent to the second data block and of the second reference sequence so as to achieve an equalized second data block; wherein the equalizing further includes performing equalization for a third data block on the basis of the encoded first data block if the first data block in the data packet exhibits a smaller temporal distance from the third data block than does the second data block, or performing equalization for the third data block on the basis of the encoded second data block if the second data block in the data packet exhibits a smaller temporal distance from the third data block than does the first data block, the third data block being located, in the data packet, at a data packet start or data packet end.

* * * * *